Nov. 27, 1956  C. A. HUGGINS ET AL  2,772,080
GAS-LIQUID CONTACT APPARATUS
Filed March 8, 1954  3 Sheets-Sheet 1
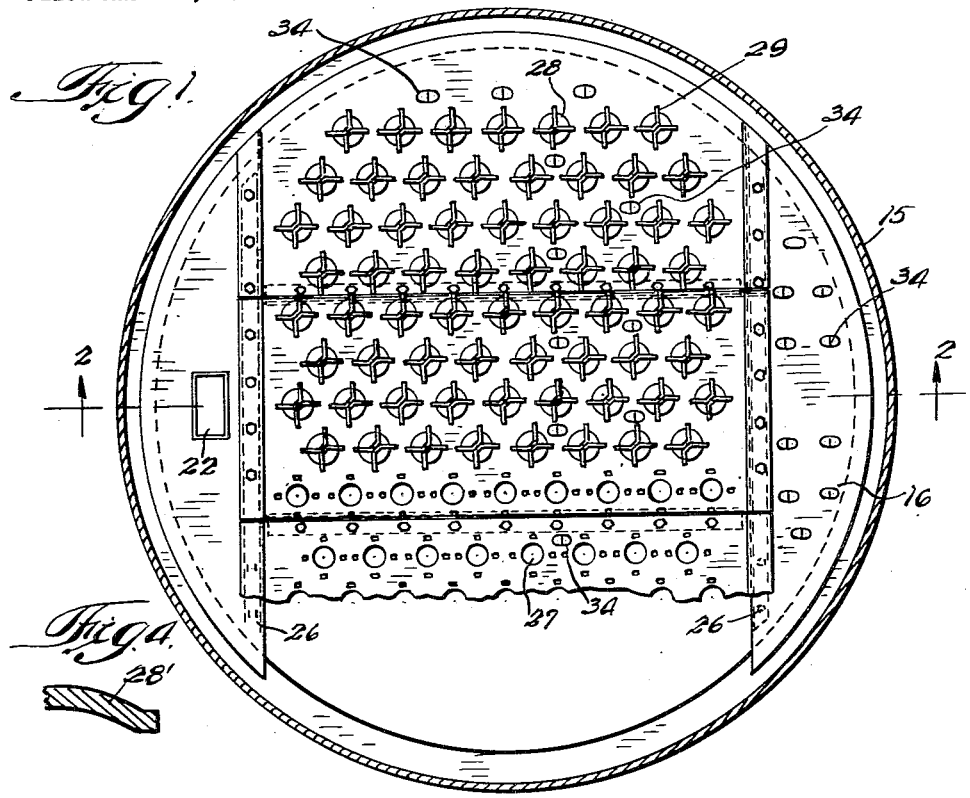
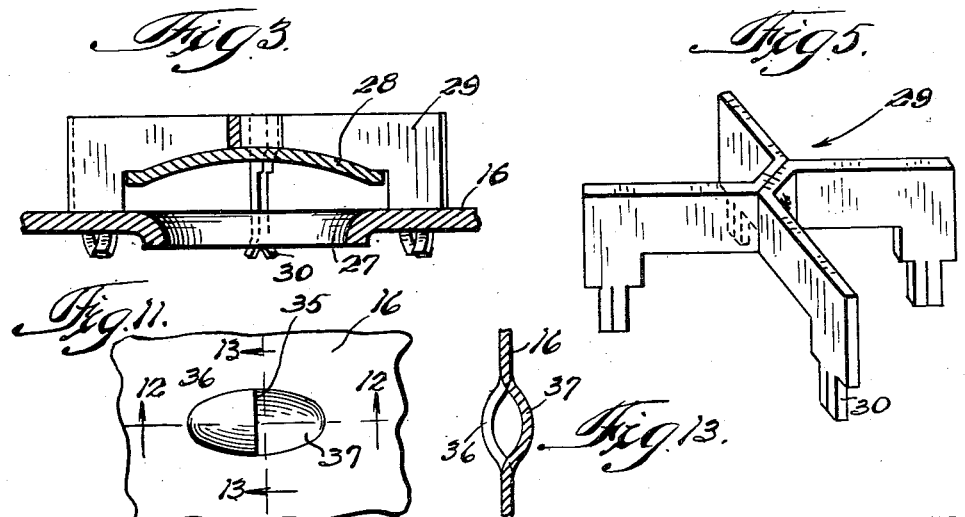
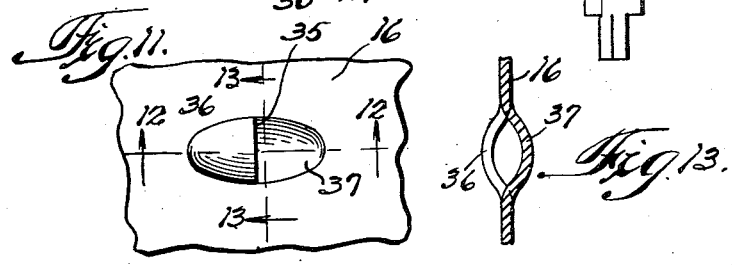
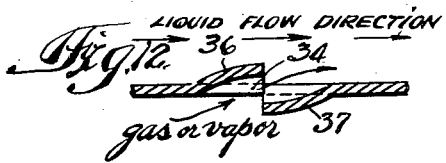
INVENTOR.
Clifford A. Huggins
Griffin C. Thrift

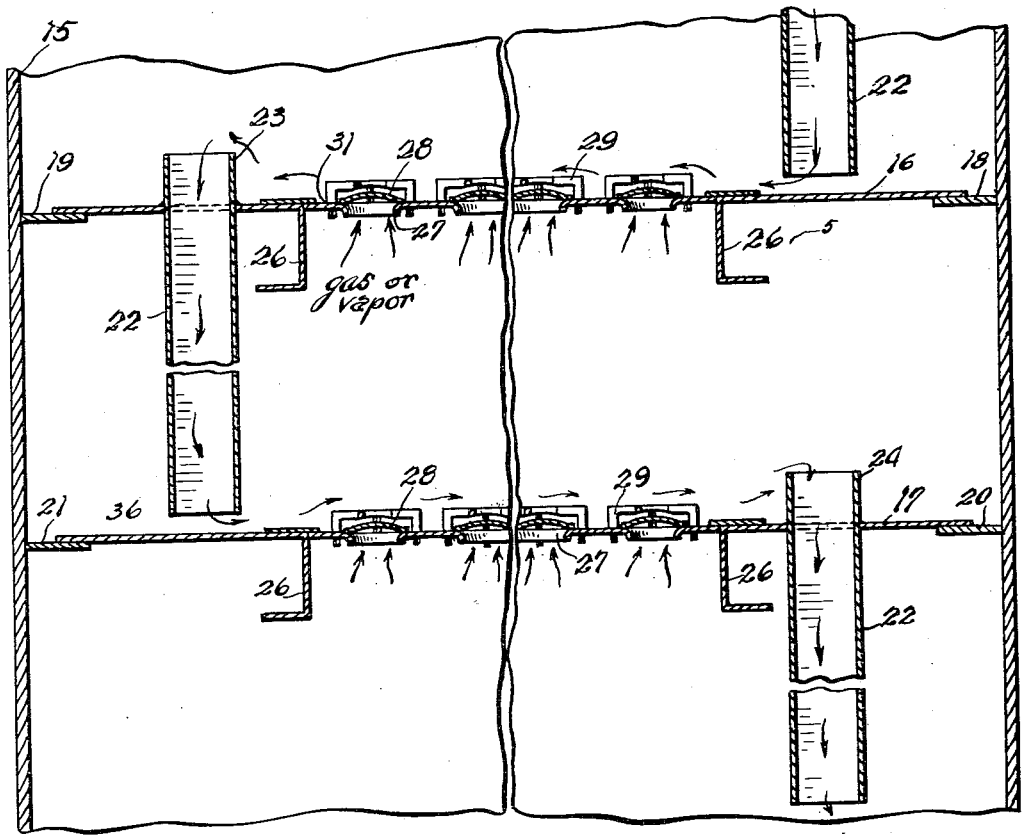
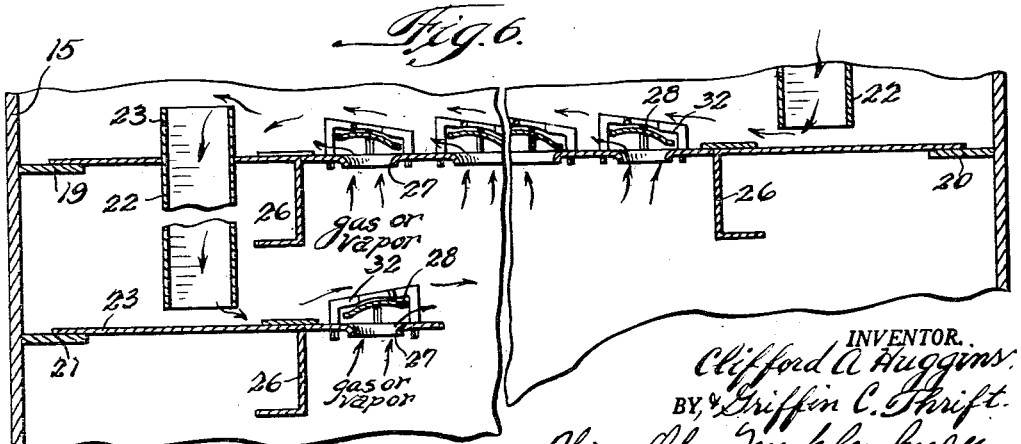

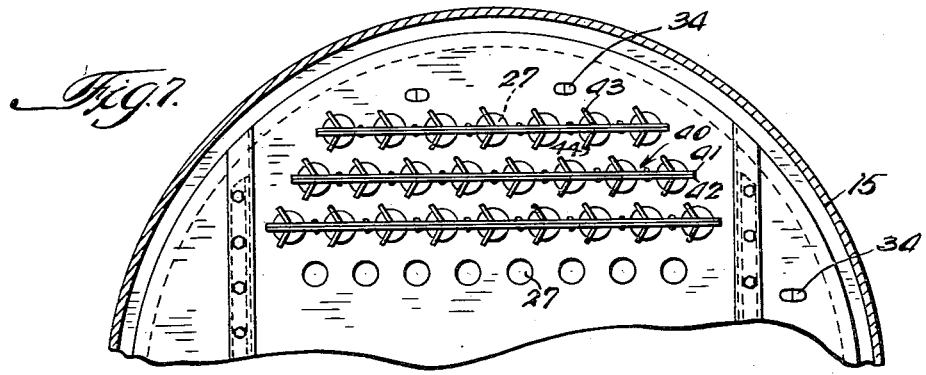

United States Patent Office
2,772,080
Patented Nov. 27, 1956

2,772,080

GAS-LIQUID CONTACT APPARATUS

Clifford A. Huggins and Griffin C. Thrift, Wichita, Kans., assignors to Koch Engineering Company, Inc., Wichita, Kans., a corporation of Kansas Application March 8, 1954, Serial No. 414,578

9 Claims. (Cl. 261—114)

The present invention relates to an improved fluid contact apparatus; and more particularly to specific improvements in the contact plates or decks therein.

The present apparatus is particularly well adapted to the fractionation of organic liquids such as hydrocarbons, alcohols, and the like; being however equally well suited for the washing of gases or in fact any operation in which effective contact between gases or vapors and liquids, or liquids and liquids, is to be effected.

The apparatus works on the general principle, already well known, of passing a gas or vapor through a liquid under conditions permitting very intimate contact between gases and the liquids. In the present apparatus means are provided for maintaining a more or less definite depth of liquid on the various contacting decks or plates, which are provided with perforations in the form of fairly good sized holes which however are covered or sealed by means of valve-like loose covers which are capable of being lifted by the force or pressure of gas existing below the contact decks.

It is one of the major objects of the present invention to provide plates or contact decks having loose liftable covers for the holes therein, these covers being of varying weights, the differently weighted covers being distributed on each deck in a predetermined configuration.

A further object of the present invention is to provide a gas-liquid contact plate or deck in which the gas-liftable covers are restrained or biased in such a way that whenever the amount of gas flow becomes great enough they will be tilted or canted in a predetermined direction whereby the impingement of the gases or vapors upon the liquid will impart to the latter a definite and desired direction of flow, preferably toward the next downflowing downcomer.

Other objects of the present invention will become apparent from the further description hereinbelow when considered in connection with the concurrently filed drawings, in which:

Figure 1 is a horizontal section through an exchange tower comprising a plan view of a portion of a gas-liquid contact device therein;

Fig. 2, on a somewhat enlarged scale as compared with Fig. 1, is a vertical section through a portion through a tower housing a gas-liquid contact apparatus showing two superposed decks and parts of the downcomers and other appurtenances connecting them;

Fig. 3 is a cross section through a portion of one of the decks on a somewhat enlarged scale to show certain details;

Fig. 4 is a fragmentary section through a portion of one of the covers used in the construction to illustrate a modification in weight or thickness;

Fig. 5, on a scale substantially the same as that of Fig. 3, is a perspective view of the means employed to limit the upward movement of the covers, being in the form of a spider;

Fig. 6 is a vertical section through a portion of the gas-liquid contact device showing a modification, being on the same scale as Fig. 2;

Fig. 7 is a partial cross section of the gas-liquid contact device showing a top plan view of a portion of one of the decks, but in a modified form;

Fig. 8 is a vertical section, on the same scale as Figs. 2 and 6, through a modified form of the gas-liquid contact device, showing details of the construction illustrated in Fig. 7;

Fig. 9, on a somewhat enlarged scale, is a cross section of details of the plate cover and lift-limiting means;

Fig. 10 is a horizontal section of the same portion of the device shown in Fig. 9;

Fig. 11 is a top plan view of a portion of a deck showing auxiliary openings therein;

Fig. 12 is a cross section along the line 12—12 of Fig. 11, and

Fig. 13 is a cross section along the line 13—13 of Fig. 12.

Referring to the figures, the apparatus may comprise a substantially cylindrical shell 15, which, however, could of course be square or of any other desired cross section. Supported within this shell are a plurality of plates or decks 16 and 17 (see Fig. 2), which are supported adjacent the peripheral walls of the shell 15 by suitable ledges 18 and 19, 20 and 21. In order to permit flow of liquid from one deck to the other, for example from deck 16 to deck 17 and from the latter to the one next below it (but not shown in the drawings) there are provided downcomers 22 which have, respectively, portions 23 and 24 which extend above the level of the decks 16 and 17. It will be seen that the lower portion of a downcomer extends almost to the upper side of deck 17 while the upstanding portion 24 of downcomer extends further above the plate or deck 17, so that when the apparatus is in operation there will be a definite amount of liquid on the plate or deck corresponding in depth to the height of the upwardly extending portions 23 and 24. The decks are further supported on the shell 15 by suitable brackets 26.

In order to effect the contact between the gas or vapor and the liquid the plates 16 and 17 are provided with a plurality of holes 27.

Surmounting said holes are a plurality of dished covers 28 which are of a size that when in position they will close the openings 27. They are entirely loose and hence are capable of being thrust upwardly by gases or vapors existing below the respective plates 16 and 17, depending of course upon the pressure thereof. In order to limit the extent of the upward movement of the dished covers 28, suitable means, for example the spiders 29, are provided, being affixed to the plates 16 and 17 by having downwardly extending split legs 30 which pass through suitable openings 31 in the plates whereafter the legs are oppositely upset so as to keep the spiders 29 in position.

Now, in order to permit of more accurate control of the operation of the gas-liquid contact device, the dished covers 28 in any particular row extending either horizontally across the plate, diagonally across the plate, or in sets of groups, may be made of different weights, as for example indicated in Fig. 4 by the thicker or heavier cover 28'. For example, the first two or three rows of covers 28 shown in Fig. 1 may be of one weight, while the next several rows may be of a heavier weight, so that at a given pressure only certain of the covers 28 will be lifted; but as the through-put of the gas-liquid contact device, for example a dephlegmating tower or gas washer, is increased, the other heavier covers 28 will also be lifted.

Under normal operation the liquid coming down through a downcomer 22 will flow, for example, across the plates 16 and 17 at about the depth equivalent to the height of the extensions 23 and 24 of the downcomer. As illustrated the flow on successive decks is oppositely directed, being to the left on plate 16 and, for example, to the right on plate 17. As in some circumstances it is advantageous to assist the transport of the liquid across a deck or plate, provisions may be made, as more particularly illustrated in Fig. 6, to make the spiders 32 with some of their legs longer than the others so that they will be tilted as in Fig. 6. When therefore the covers 28 are lifted, the extent of their lift will be restrained on one side (the right side in Fig. 6) but their lift may be considerably greater on the left side so that the gases or vapors issuing from the holes 27 will tend to escape in greater volume from the left side of the now uncovered holes 27 and therefore will exert a leftwardly directed horizontal thrust against the liquid flowing from the right hand downcomer 22, to the left hand downcomer 22, of Fig. 6. As fragmentally illustrated at the left hand portion of Fig. 6 and on the next lower deck 33 where the orientation of the tilted spiders 32 is in the opposite sense, the liquid will be impelled toward the right.

Decks having covers such as illustrated in Fig. 2 may, if desired, be alternated with decks as illustrated in Fig. 6, or the entire tower may be made up of plates such as shown in Fig. 2 or in Fig. 6.

It may be desirable in both types of construction (those shown by Fig. 2 as well as by Fig. 6) to have additional means present to give a directional thrust to the liquid on the plates or decks. This may be accomplished by providing a portion of the decks intermediate the covered holes 27 with a number of openings 34 as shown in greater detail in Figs. 11, 12 and 13. Thus the plate 16 may have first formed therein a plurality of slits 35 whereafter the material 36 to the left of the slit is deformed upwardly and the portion of the material 37 on the other side of the slit is deformed downwardly, thus producing the opening 34 through which the gas or vapor may pass in the direction of the arrows shown in Fig. 12. Any number of these auxiliary thrust providing openings 34 may be present on the contact decks.

The openings 34, produced by slitting the plates and distorting the metal adjacent thereto, may be provided preferably over the whole areas of the decks in any desired geometrical pattern, the openings 34 being so placed as to impart to the liquid a more or less horizontal thrust in the direction of the liquid flow, so as positively to urge the liquid to flow across the deck or plate. The presence of these openings 34 will also serve to drain the decks when the apparatus is shut down and no gases are being passed through it. It is evident that the actual size of the openings 34 can be controlled by the amount of upward and downward deformation of the metal of the plates, thus giving almost any desired degree of flow of gases or vapors into the liquid flowing across the decks. The presence of such means to influence the flow of the liquid will counteract any tendency for the establishment of a, perhaps undesired, liquid gradient on the decks.

As illustrated in Figs. 7 through 10, the construction may differ somewhat, while still remaining within the generalized teachings of the present invention. Thus, as shown in the said figures, the holes 27, instead of being closed by means of the type of dished covers 28 and 28' already described, may be closed by convex dished covers 38 which extend into the holes with their convex sides, acting in many respects as does a valve on its seat. These covers 38 may be provided with a number, for example 3, of peripheral inwardly extending cut-away portions 39. Instead of using a separate spider for each opening, the means for keeping the covers 38 from being lifted too far may comprise a continuous strip 40 consisting of two suitably secured individual elongated metallic strips 41 and 42. The strips 41 and 42 are partly cut away as best seen in Fig. 9 and the portions thus resulting are bent outwardly in alternately right and left hand directions to form extensions 43 and 44, as can best be seen in Figs. 7 and 9. These pieces extend into the aforementioned cut away portions or notches 39. Therefore when gas or vapor pressure serves to raise the covers 38 out of the hole 27 they will be prevented from rising too far upwardly by abutting against the strips 41 and 42. The holes 27 in this case are presumed to have been formed in plates such as 16 and 17 which are connected with the same kind of downcomers 22 as already mentioned.

In connection with Fig. 8 it will be seen that the lower part of downcomer 22 dips into a suitable trough 45 from which any liquid overflows onto deck 17. This therefore provides the necessary seal at the bottom of downcomer 22 to prevent gases from finding their way to the next deck and compels them to pass through the holes 27 after lifting the covers 38.

Just as has been mentioned in connection with the previous figures, the covers 38 may likewise vary in weight and be distributed in definite configurations relative to the extent of the plates or decks 16 and 17.

Both types of construction may be used either in the same tower, or the tower may contain, in addition to the decks or plates as described in the present invention, other contact devices such as plain perforated plates, bubble trays, or the types of contact plate described in the patent to Fred C. Kock No. 2,401,569, or in the patent application of C. A. Huggins, Serial No. 243,240.

The particular advantage in having the plates so arranged that the covers may be given a tilted position, particularly as shown in Fig. 6, lies in the fact that it thereby becomes possible to impart to the liquid on the trays or deck a definite predetermined direction which serves to equalize the pressure of any liquid which lies above the covers 28 or 38.

It has been found that by suitably arranging a pattern of relatively heavier and lighter covers 28 or 38, the exchange characteristics of a given deck may be accurately predetermined and hence adapted to any particular condition depending upon the use to which the gas-liquid device is being put. Inasmuch as the use of graded weights with increased vapor loads allows definite predetermination of resistance to the vapor or gas pressure this will insure proper distribution at low loads and still provide a wide range of efficient operation with increased loads without incurring the risk of undesired run-back.

By combining the presently described type of tray or deck with the type of exchange devices which do not permit the retention of a definite liquid level, it is possible to construct exchange towers of almost any desired gas-liquid exchange characteristics.

Self evidently the size of the openings or holes 27 and the therewith cooperating covers 28 or 38 may vary widely, depending entirely upon the size of the apparatus, and may vary from one-half inch or so in diameter up to four or more inches in diameter. The material may be of any suitable kind which is not attacked by the gases or vapors which are to be treated in the exchange device. For most purposes stainless steel or aluminum are the most suitable and readily available, but suitable plastic materials might be employed under conditions where the liquids and vapors treated have no solvent effect upon the plastic from which the plates and covers are made. It might even be possible to combine plastic covers with metallic plates or vice versa, or else to alternate plastic covers with metallic covers, thereby inherently controlling the weight of the covers.

While spiders such as 29 and those made of the strips 41 and 42 have been illustrated, the invention is not to be limited to the use of these particular means wherewith to limit the upward movement of the covers 28 or 38, as any equivalent mechanical means are to be construed as being within the scope and intent of the hereunto appended claims.

It is usually preferred that the liquid thrust-producing elements (i. e. the slits 34 and the cantable covers 28 and 38 shown in Figs. 6 to 10) be more or less uniformly spaced over the tray surface in order that uniform thrust is imparted to the liquid. However, the differently weighted covers and openings 34 may be arranged in any desired geometrical pattern. In operation, and as the vapor load gradually increases, the gas or vapor first passes upwardly through slits 34 and thereafter the vapor first lifts all of the light weight caps and then the heavier caps. Thus uniform operation over the entire tray surface is achieved under a wide range of vapor or gas loads. It will be understood of course that the pressure required from below to lift the caps depends not only upon the weight of the individual caps but also upon the depth to which the cap is submerged in liquid flowing across the tray. Thus another way of controlling the opening of the covers is to form the tray in such a manner (e. g. stepwise) so that some covers 28 or 38 and some apertures 34 will be more submerged, and thus openable under higher gas pressures, than others.

While this invention has been described with particular reference to gas or vapor and liquid contact, it also finds usefulness in the art of liquid-liquid contacting.

We claim:

1. A gas-liquid contact apparatus comprising a housing and a plurality of superposed gas-liquid contacting plates therein, downcomers connecting said plates to permit liquid to flow downwardly from an upper and a lower plate, the downcomers being staggeredly arranged so that liquid will flow in opposite directions on alternate plates and means for establishing a normal liquid level on said plates; each plate being provided with substantially circular openings; loose covers for said openings liftable by gas pressure from beneath said plates; means above said covers for limiting the upward movement thereof, said means being tilted to cant the covers when lifted so as to permit more gas to escape on one edge of the covers than the other, the direction of maximum escape being such as to tend to assist horizontal movement of the liquid across the trays.

2. The device as claimed in claim 1 in which the covers differ in weight, covers of a given weight being arranged on the plates in a predetermined configuration.

3. The device as claimed in claim 2 in which the covers in one transverse row are different in weight from the weight of those in another row.

4. A contact device comprising a plate with a plurality of apertures therein, said apertures being substantially uniform in size, loose covers for said apertures and liftable therefrom by fluid pressure exerted from beneath said plate, certain of said covers having greater mass than other covers, means secured to the upper surface of said plate for limiting the upward movement of all of said covers, at least some of said movement limiting means being formed to cant the corresponding cover from a horizontal position when the cover is lifted to its fullest extent, said certain covers requiring more fluid pressure from underneath for lifting than said other covers, said certain covers and said other covers each being arranged in a predetermined geometrical pattern.

5. A contact device comprising a plate provided with a plurality of groups of perforations, loose covers for said perforations liftable therefrom by fluid pressure exerted from beneath said plate, and means for limiting the upward movement of said covers, the covers and perforations of each group being arranged uniformly across a predetermined area in said tray, all the covers of one group being of substantially greater weight per unit area of the corresponding perforation than the covers of another group, the resistance to lifting by said fluid pressure of the covers of said one group thereby being substantially uniform but substantially lower than the resistance to lifting by said fluid pressure of covers of said other group, whereby covers offering said lower resistance will permit substantial bubbling over said predetermined area even though the liquid pressure head is not uniform over said area.

6. The device recited in claim 5 wherein the covers of said one group are arranged in rows across said plate.

7. The device recited in claim 5 wherein at least certain of said movement limiting means are formed to cant the corresponding cover from a horizontal position when the cover is lifted to its fullest extent.

8. The device recited in claim 5 wherein said perforations are circular and said covers are in the form of concavo-convex discs.

9. The device recited in claim 8 wherein the concave sides of said discs face the perforations.

References Cited in the file of this patent

UNITED STATES PATENTS

| 948,432   | Rudeen   | Feb. 8, 1910  |
| 2,061,830 | Campbell | Nov. 24, 1936 |
| 2,428,889 | Nutter   | Oct. 14, 1947 |

FOREIGN PATENTS

| 619,029 | France        | Dec. 23, 1926 |
| 682,721 | Great Britain | Nov. 12, 1952 |